United States Patent [19]
Hermann et al.

[11] 3,883,100
[45] May 13, 1975

[54] RESILIENT ENGINE MOUNT AND ALIGNMENT MEANS AND METHOD THEREFOR

[75] Inventors: Arthur D. Hermann, Chillicothe; William C. Hurt, II, Brimfield; Bruce W. Miers, Peoria Heights, all of Ill.

[73] Assignee: Caterpillar Tractor Company, Peoria, Ill.

[22] Filed: Feb. 14, 1974

[21] Appl. No.: 442,466

[52] U.S. Cl. .................................. 248/9; 180/64 R
[51] Int. Cl. .................... F16m 5/00; F16f 15/00
[58] Field of Search ............ 248/3, 5, 6, 7, 8, 9, 10, 248/22, 358 R; 180/64 R

[56] References Cited
UNITED STATES PATENTS

| | | | |
|---|---|---|---|
| 1,635,388 | 7/1927 | Riise | 180/64 R |
| 1,694,756 | 12/1928 | Short | 248/9 |
| 1,761,584 | 6/1930 | Prosser | 248/10 |
| 2,903,208 | 9/1959 | Everitt | 248/9 |

FOREIGN PATENTS OR APPLICATIONS

| | | | |
|---|---|---|---|
| 680,147 | 10/1952 | United Kingdom | 248/8 |

*Primary Examiner*—J. Franklin Foss
*Attorney, Agent, or Firm*—Phillips, Moore, Weissenberger, Lempio & Strabala

[57] ABSTRACT

The aft end of an engine is mounted on the frame of a vehicle by a pair of laterally spaced engine mounts each comprising a bracket releasably attached to the engine and a pair of resilient bushing assemblies mounting ends of the bracket on the frame. During re-installation of the engine, a pilot screw, threadably mounted in the bracket, is adapted to be inserted into a pilot bore formed in the frame to precisely locate the engine thereon.

13 Claims, 4 Drawing Figures

RESILIENT ENGINE MOUNT AND ALIGNMENT MEANS AND METHOD THEREFOR

BACKGROUND OF THE INVENTION

Conventional track-type tractors normally mount an engine on the frame thereof by three engine mounts disposed in triangular relationship when viewed in top plan. The engine mounts are subjected to dynamic forces during vehicle operation, thus requiring resilient support bushings or the like to deter the transmission of such forces between the frame and the engine.

Oftentimes, conventional engine mounts cannot be used on a vehicle due to space limitations. In addition, upon engine removal and replacement of conventional engine mounts, drive train components oftentimes become misaligned. Such misalignment, if not corrected by the employment of time-consuming guaging methods, could cause premature failure of such drive train components and in particular the universal joint connections thereof.

SUMMARY OF THIS INVENTION

An object of this invention is to overcome the above, briefly described problems by providing a compact and improved engine mount as well as means and a method for precisely aligning an engine on a frame of a vehicle. The engine mount comprises a bracket releasably attached to the engine and a pair of resilient bushing assemblies, adapted to be sized smaller than conventional ones, mounting the bracket on the frame of the vehicle. Further novel aspects of this invention involve the use of alignment means and a method for assuring precise remounting of the engine on the frame subsequent to its removal for servicing purposes.

BRIEF DESCRIPTION OF THE DRAWINGS

Other objects of this invention will become apparent from the following description and accompanying drawings wherein.

DETAILED DESCRIPTION

Figure 1:
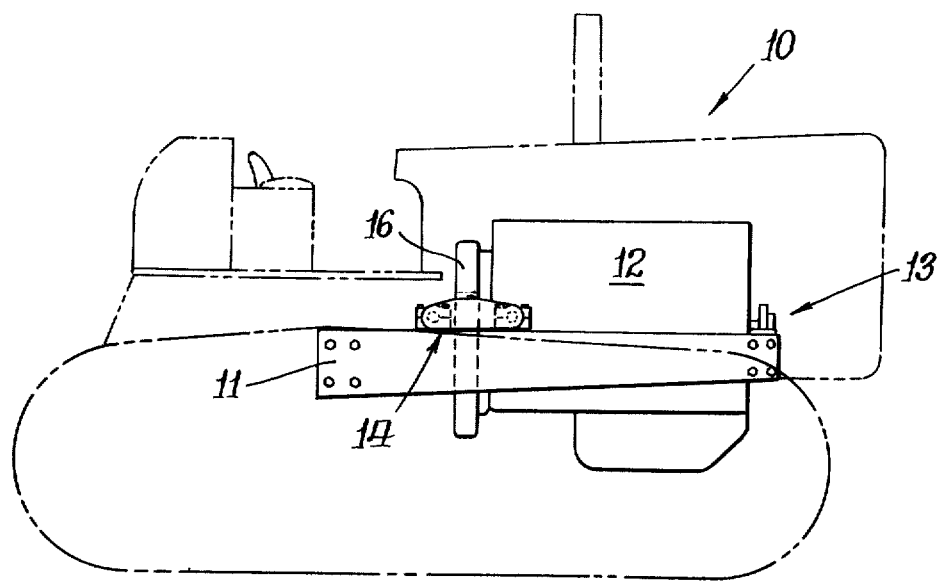
FIG. 1 is a side elevational view of a track-type tractor, shown in phantom lines, having an engine mount of this invention employed therein.

Referring to FIG. 1, a track-type tractor 10 comprises a frame 11 having an engine 12 mounted thereon by three engine mounts 13 and 14 (two shown) disposed in triangular relationship with respect to each other when viewed in top plan. First engine mount 13, similar to the one disclosed in U.S. Pat. No. 3,633,856, is provided at the front, longitudinal center of the engine. Second and third identical engine mounts 14 (one shown) are provided at the aft end of the engine and on opposite, transverse sides thereof.

Figure 2:
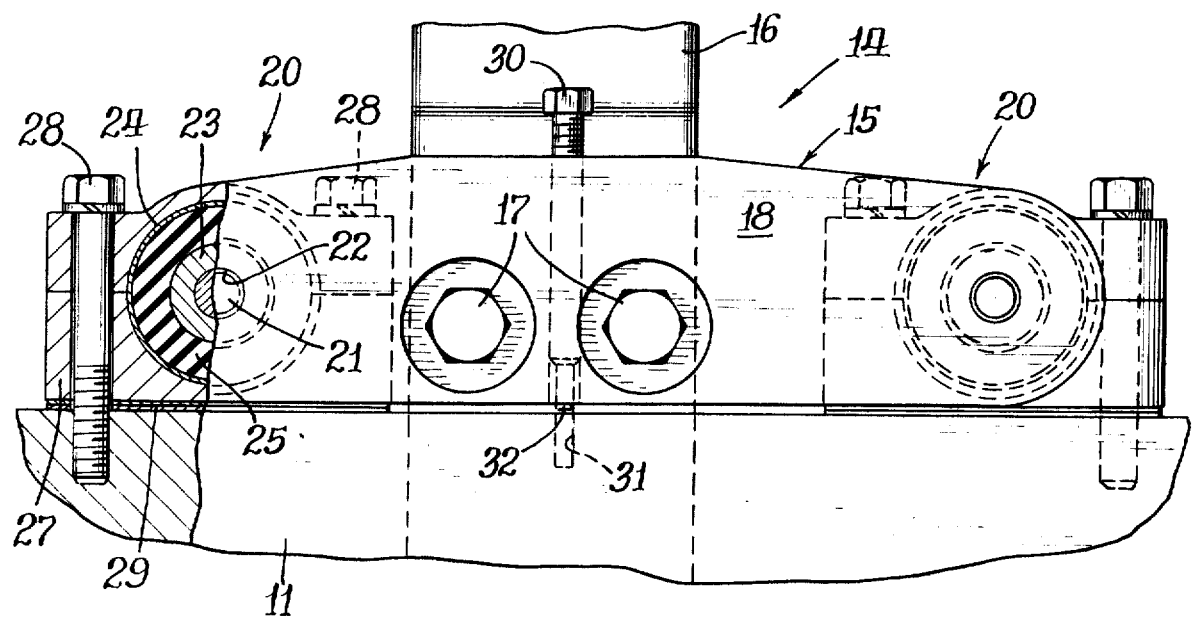
FIG. 2 is an enlarged, partially sectioned side elevational view of the engine mount.
Figure 3:
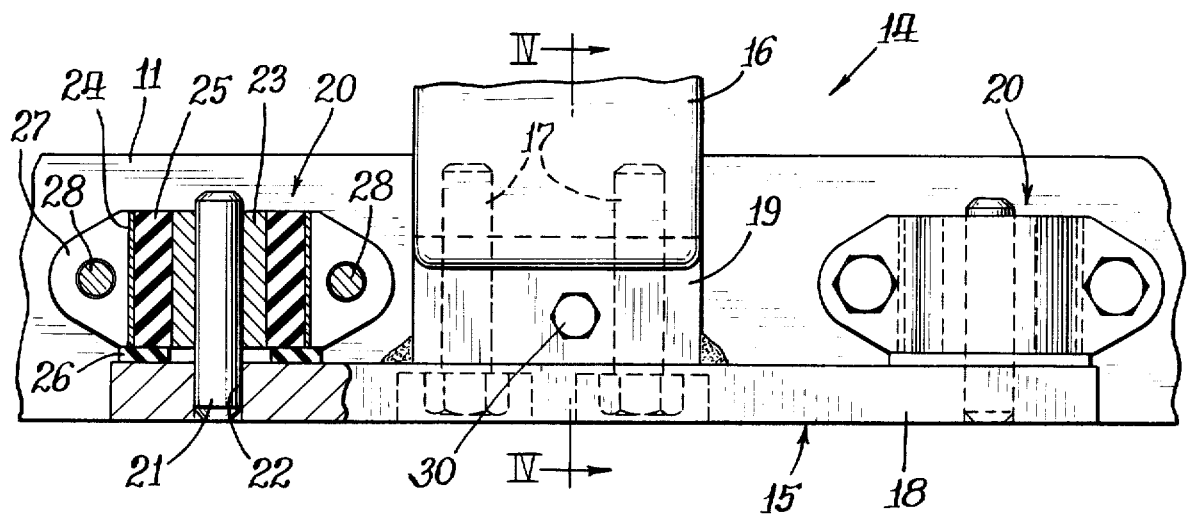
FIG. 3 is a partially sectioned, top plan view of the FIG. 2 engine mount.

As shown in FIGS. 2 and 3, each engine mount 14 comprises a bracket 15 attached to a flywheel housing 16 of the engine by fastening means, such as a pair of bolts 17. The bracket comprises a vertically disposed plate 18 having a mounting block 19 welded or otherwise suitably secured to a back side thereof and disposed between the plate and the engine. A pair of identical bushing assemblies 20, disposed on either side of bolts 17, resiliently mount bracket 15 on frame 11.

Each bushing assembly comprises a pin 21 press-fitted or otherwise suitably secured in a bore 22 formed in plate 18, a cylindrical bushing 23 mounted on the pin, a cylindrical sleeve 24 and an annular elastomeric bushing 25 disposed and preferably compressed between bushing 23 and sleeve 24. In addition, an annular elastomeric pad 26 (FIG. 3) may be disposed between an end wall of the sleeve and plate 18 to absorb axial forces imparted thereto. The bushing assembly is releasably attached to frame 11 by a pair of clamping members 27 and a pair of bolts 28. Shims 29 may be mounted between the lower clamping member and the frame to position the engine in its correct vertical disposition relative to its attendant drive train components (not shown).

Alignment means are employed in the engine mount for precisely relocating the engine on frame 11 subsequent to removal thereof for servicing purposes. Such alignment means comprises a first locating means or pilot screw 30 threadably mounted in block 19 to overlie a second locating means or pilot bore 31, formed in the upper surface of frame 11. FIG. 2 discloses the pilot screw in its retracted position whereby a smooth pilot end 32 thereof is disposed upwardly from the frame to prevent metal-to-metal contact therebetween.

Figure 4:
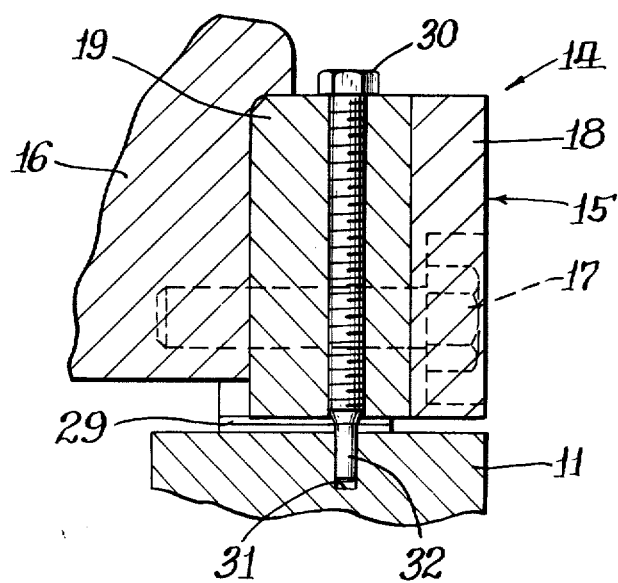
FIG. 4 is a sectional view taken in the direction of arrows IV—IV in FIG. 3, illustrating an alignment means of the engine mount in its extended position for aligning an engine relative to a frame of the vehicle.

Subsequent to removal of engine 12, by disassembling engine mount 13 and by releasing bolts 28, the engine may be remounted in substantially the same position on frame 11 to assure precise alignment of the drive train components connected thereto. Such precise remounting is accomplished by rotating pilot screw 30 to its extended FIG. 4 position whereby smooth pilot end 32 thereof engages bore 31. Thereafter, front engine mount 13 is reassembled, bolts 28 are set in place to reclamp bushing assemblies 20 in position and pilot screw 30 is retracted to its FIG. 2 position to prevent metal-to-metal contact between the engine and the frame.

We claim:

1. A resilient engine mount releasably mounting an engine on a frame of a vehicle comprising a bracket, fastening means attaching said bracket to said engine and a pair of resilient bushing assemblies, disposed on either side of said fastening means, mounting said bracket on said frame, said bracket comprising a vertically disposed plate and a mounting block mounted on top of said frame and secured to a back side of said plate and disposed between said plate and said engine, said fastening means extending through said plate and mounting block and attached to a side of said engine.

2. The engine mount of claim 1 wherein each of said bushing assemblies comprises a pin secured to said bracket, a cylindrical bushing mounted on said pin, a cylindrical sleeve and an annular elastomeric bushing disposed radially between said bushing and said sleeve.

3. The engine mount of claim 2 wherein each of said bushing assemblies further comprises an elastomeric pad disposed axially between an end wall of said sleeve and said bracket.

4. The engine mount of claim 1 wherein an aft end of said engine is mounted on said frame by a pair of said engine mounts disposed on opposite, transverse sides of said engine and wherein each of said fastening means are releasably attached to a flywheel housing of said engine.

5. The engine mount of claim 1 further comprising first locating means adjustably mounted on said bracket to overlie second locating means on said frame.

6. The engine mount of claim 5 wherein said first locating means comprises a pilot screw threadably mounted in said bracket.

7. The engine mount of claim 6 wherein said second locating means comprises a pilot bore formed in said frame in axial alignment with said pilot screw, said pilot screw retracted out of said pilot bore.

8. In a resilient engine mount releasably mounting an engine on a frame of a vehicle, the invention comprising first locating means adjustably mounted on said engine mount to overlie second locating means on said frame and wherein said engine mount comprises a vertically disposed plate and a mounting block secured to a back side of said plate and disposed between said plate and said engine, said first locating means adjustably mounted in said mounting block to overlie said second locating means.

9. The invention of claim 8 wherein said first locating means comprises a pilot screw threadably mounted in a bracket of said engine mount.

10. The invention of claim 9 wherein said second locating means comprises a pilot bore formed in said frame in axial alignment with said pilot screw, said pilot screw retracted out of said pilot bore.

11. The invention of claim 8 wherein said engine mount further comprises a pair of bushing assemblies disposed on either side of said mounting block and mounting said plate on said frame.

12. A method for remounting an engine on a frame of a vehicle comprising the steps of
positioning a first locating means, adjustably mounted on said engine, over a second locating means on said frame; and
inserting an end of said first locating means in said second locating means.

13. The method of claim 12 further comprising the steps of
attaching said engine on said frame by engine mounts and
retracting said first locating means out of said second locating means.

* * * * *